(12) United States Patent
Gao et al.

(10) Patent No.: US 10,289,490 B2
(45) Date of Patent: May 14, 2019

(54) METHOD AND APPARATUS FOR FACILITATING STORAGE SYSTEM RECOVERY AND RELEVANT STORAGE SYSTEM

(71) Applicant: EMC IP HOLDING COMPANY LLC, Hopkinton, MA (US)

(72) Inventors: Hongpo Gao, Beijing (CN); Geng Han, Beijing (CN); Jibing Dong, Beijing (CN); Jian Gao, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 85 days.

(21) Appl. No.: 15/384,364

(22) Filed: Dec. 20, 2016

(65) Prior Publication Data

US 2017/0185498 A1 Jun. 29, 2017

(30) Foreign Application Priority Data

Dec. 29, 2015 (CN) .......................... 2015 1 1017523

(51) Int. Cl.
| | |
|---|---|
| *G06F 11/00* | (2006.01) |
| *G06F 11/10* | (2006.01) |
| *G06F 11/20* | (2006.01) |
| *G06F 11/07* | (2006.01) |
| *G06F 11/14* | (2006.01) |

(52) U.S. Cl.
CPC ...... *G06F 11/1084* (2013.01); *G06F 11/0727* (2013.01); *G06F 11/0787* (2013.01); *G06F 11/1417* (2013.01); *G06F 11/2094* (2013.01)

(58) Field of Classification Search
CPC ............ G06F 11/1417; G06F 11/2094; G06F 11/0727; G06F 11/0787; G06F 11/0793; G06F 11/0766; G06F 11/2284
See application file for complete search history.

(56) References Cited

U.S. PATENT DOCUMENTS

| | | | | |
|---|---|---|---|---|
| 7,631,219 B2 * | 12/2009 | Franklin | ............. | G06F 11/0727 |
| | | | | 714/6.32 |
| 9,317,383 B2 * | 4/2016 | Petersen | ............. | G06F 11/2092 |
| 2007/0088990 A1 * | 4/2007 | Schmitz | ................. | G11B 20/20 |
| | | | | 714/700 |
| 2008/0172571 A1 * | 7/2008 | Andrews | ............. | G06F 11/1076 |
| | | | | 714/6.12 |
| 2008/0244585 A1 * | 10/2008 | Candea | ................. | G06F 11/008 |
| | | | | 718/102 |

(Continued)

*Primary Examiner* — Charles Ehne
(74) *Attorney, Agent, or Firm* — BainwoodHuang

(57) ABSTRACT

Embodiments of the present invention provide a method of facilitating recovering a storage system, the storage system comprising a plurality of system disks for storing system information of the storage system, and at least one array associated with the plurality of system disks to manage the plurality of system disks, the method comprising: in response to failure of at least one system disk in the plurality of system disks, determining a performance deterioration degree of the at least one disk array; and in response to the performance deterioration degree of the at least one disk array being a first level, setting boot information of the one disk away to a first value, where the first value indicates skipping creation of the one disk array during a booting process of the storage system.

20 Claims, 7 Drawing Sheets

(56) References Cited

U.S. PATENT DOCUMENTS

2010/0199131 A1\* 8/2010 Yoshida ................ G06F 11/008
  714/54
2013/0086415 A1\* 4/2013 Petersen ............. G06F 11/2076
  714/6.3

\* cited by examiner

METHOD AND APPARATUS FOR FACILITATING STORAGE SYSTEM RECOVERY AND RELEVANT STORAGE SYSTEM

RELATED APPLICATIONS

This application claim priority from Chinese Patent Application Number CN201511017523.8, filed on Dec. 29, 2015 at the State Intellectual Property Office, China, titled "METHOD AND APPARATUS FOR FACILITATING STORAGE SYSTEM RECOVERY AND RELEVANT STORAGE SYSTEM," the contents of which is herein incorporated by reference in its entirety

FIELD

Embodiments of the present invention relate to the field of a storage system, and more specifically relate to a method and apparatus for facilitating recovering a storage system from a failure, a method and apparatus for booting a storage system, and a storage system.

BACKGROUND

A storage system refers to a system composed of various storage devices for depositing programs and data, control members, and devices and algorithms for managing information scheduling. When the storage system includes a plurality of magnetic disk drives (or shortly referred to as a "magnetic disk"), part of magnetic disk drives are usually used for storing system information of the storage system which is used by the storage system per se. This part of magnetic disk drives is referred to as "system disk drives" (or shortly referred to as a "system disk") herein. In contrast, the remaining disk drives used by a user to store data are referred to as "user disk drives" (or shortly referred to as a "user disk"). As the system disk stores information related to system, the system disk are crucial to running of the storage system. Therefore, it has become one of hot topics in the field of storage systems regarding management of a system disk and how to recover a system disk and then recover the storage system from a failure when the system disk fails.

Currently, a redundant array of independent disks (hereinafter shortly referred to as "RAID" or "disk array") is widely applied to system disks that manage a storage system, which prevents data loss caused by failure of the disk or storage device by using redundancy of data and device. Dependent on different needs of protection degrees, different RAID levels are defined, for example, RAID 0, RAID 1, RAID 3, RAID 5, RAID 6, RAID 10, triple mirror and the like. However, if the number of failed system disks is too large (for example, for RAID 3 or RAID 5, two system disks fail), the system disk data cannot be recovered relying on the redundancy of the RAID, even if the RAID is used to manage system disks. In this case, the practice in the prior art is always returning the system disks to the manufacturers and re-mirroring the system disks to an initial state. The consequence is that all data in the array will be lost and the system will return to an out-of-factory default state, which not only increases costs but also is inefficient.

SUMMARY

In order to solve the problems existing in the prior art, various embodiments of the present disclosure provide a solution that facilitates recovering a storage system, a corresponding solution of booting the storage system, and the storage system per se.

According to a first aspect of the present invention, there is provided a method of facilitating recovering a storage system. The storage system includes a plurality of system disks for storing system information of the storage system, and at least one disk array associated with the plurality of system disks for managing the plurality of system disks. The method comprises: in response to determining that at least one system disk in the plurality of system disks fails, determining a performance deterioration degree of the at least one disk array; and in response to the performance deterioration degree of a disk array being a first level, setting boot information of the disk array to a first value, the first value indicating skipping creation of the disk array during a booting process of the storage system.

In an optional embodiment of the present invention, the method further comprises: in response to a failed system disk in the failed system disks being replaced, determining a performance deterioration degree of the at least one disk array; and in response to the performance deterioration degree of a disk array in the at least one disk array being a second level, notifying the disk array that data of the one system disk is to be recovered. In a further optional embodiment of the present invention, a performance deterioration degree at the first level is higher than a performance deterioration degree at the second level.

In an optional embodiment of the present invention, the method further comprises that the replaced system disk is used as a part of the storage system when all disk arrays associated with the one system disk are notified that the data of the one system disk is to be recovered. In a further optional embodiment of the present invention, the method further comprises recovering the data of the replaced system disk from backup data of the storage system.

In an optional embodiment of the present invention, after the replaced system disk is used as a part of the storage system, the method further comprises: modifying the boot information of which value is the first value as a second value which indicates creating a disk array corresponding thereto during a booting process of the storage system, and all data in the created disk array being set to zero.

In an optional embodiment of the present invention, the first level or the second level is determined based on the number of failed system disks.

In an alternative embodiment of the present invention, the disk array includes at least one of RAID 3 and RAID 5.

In an optional embodiment of the prevent invention, two of the plurality of system disks are failed.

According to a second aspect of the present invention, there is provided a method of booting a storage system. The storage system comprises a plurality of system disks for storing system information of the storage system, and at least one disk array associated with the plurality of system disks for managing the plurality of system disks. The method comprises: reading corresponding boot information of the at least one disk array; and in response to the boot information of a disk array in the at least one disk array being a first value, skipping creation of the one disk array.

In an optional embodiment of the present invention, the method further comprises in response to the boot information of the a disk array in the at least one disk array being a second value, creating the one disk array, the second value being different from the first value.

According to a third aspect of the present invention, there is provided an apparatus for facilitating recovering a storage system. The storage system includes a plurality of system disks for storing system information of the storage system, and at least one disk array associated with the plurality of system disks for managing the plurality of system disks. The apparatus comprises: a first determining module configured to determine a performance deterioration degree of the at least one disk array in response to determining that at least one system disk in the plurality of system disks fails; and a first setting module configured to, in response to the performance deterioration degree of the at least one disk array being a first level, set boot information of the one disk array to a first value, the first value indicating skipping creation of the one disk array during a booting process of the storage system.

In an optional embodiment of the present invention, the apparatus further comprises: a second determining module configured to, in response to one system disk in failed system disks being replaced, determine a performance deterioration degree of the at least one disk array; and a notifying module configured to, in response to the performance deterioration degree of the at least one disk array being at a second level, notify the disk array that data of the system disk is to be recovered. In a further optional embodiment of the present invention, a performance deterioration degree at the first level is higher than a performance deterioration degree at the second level.

In an optional embodiment of the present invention, the apparatus further comprises: a new disk launching module configured to, when all disk arrays associated with the one system disk are notified that the data of the one system is to be recovered, use the replaced system disk as a part of the storage system. In a further optional embodiment of the present invention, the new disk launching module is further configured to modify the boot information of which value is the first value as the second value after the replaced system disk is used as a part of the storage system.

In an optional embodiment of the present invention, the apparatus further comprises: a recovering module configured to recover data in the replaced system disk from the backup data in the storage system.

In an optional embodiment of the present invention, the first level or the second level is determined based on the number of failed system disks.

In an optional embodiment of the present invention, the disk array comprises at least one of RAID 3 and RAID 5.

In an optional embodiment of the present invention, two of the plurality of system disks are failed.

According to a fourth aspect of the present invention, it provides an apparatus for booting a storage system. The storage system includes a plurality of system disks for storing system information of the storage system, and at least one disk array associated with the plurality of system disks for managing the plurality of system disks. The apparatus comprises: a reading module configured to read corresponding boot information of the at least one disk array; and a creating module configured to, in response to the boot information of one disk array in the at least one disk array being a first value, skip creation of the one disk array.

In an optional embodiment of the present invention, the creating module is further configured to, in response to boot information of one disk array in the one or more disk arrays being a second value different from the first value, create the one disk array.

According to a fifth aspect of the present invention, it provides a storage system. The storage system comprises a plurality of system disks for storing system information of the storage system, and at least one disk array for managing the plurality of system disks, wherein at least one system disk of the plurality of system disks store at least one boot information for the at least one disk array, and when a value of the boot information is the first value, it indicates skipping creation of a corresponding disk array during a booting process of the storage system.

According to the above embodiments of the present invention, when at least one system fails, successful launching of a new disk is facilitated, so as to recover a storage system from a failure efficiently with a low cost.

BRIEF DESCRIPTION OF THE DRAWINGS

Through more detailed depiction of the exemplary embodiments of the present disclosure with reference to the accompanying drawings, the above and other objectives, features and advantages of the present disclosure will become more apparent, where in the exemplary embodiments of the present disclosure, same reference numerals generally represent same components.

DETAILED DESCRIPTION OF EMBODIMENTS

Figure 1:
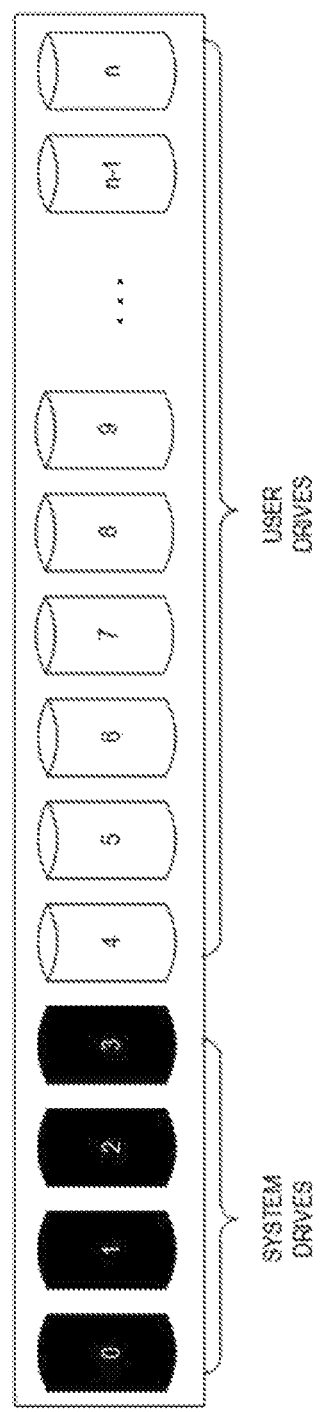
FIG. 1 illustrates a typical array comprising system disks and user disks.

Hereinafter, the preferred embodiments of the present disclosure will be described in more detail with reference to the accompanying drawings. Although the accompanying drawings illustrate the preferred embodiments of the present disclosure, it should be understood that the present disclosure may be implemented in various forms, not limited to embodiments illustrated here. On the contrary, providing these embodiments is for making the present disclosure more thorough and complete, so as to be capable of completely conveying the scope of the present disclosure to those skilled in the art. In addition, similar reference numerals represent same or similar parts throughout the drawings.

FIG. 1 illustrates a typical array includes system disks and user disks. As illustrated in FIG. 1, disk drives 0-3 are system disks, while disk drives 4-n are user disks. Those skilled in the art should understand that although FIG. 1 only illustrates that the system disk includes 4 disk drives, in implementation, there may be any number of system disks according to the specific needs, and the present invention is not limited in this aspect.

Figure 2:
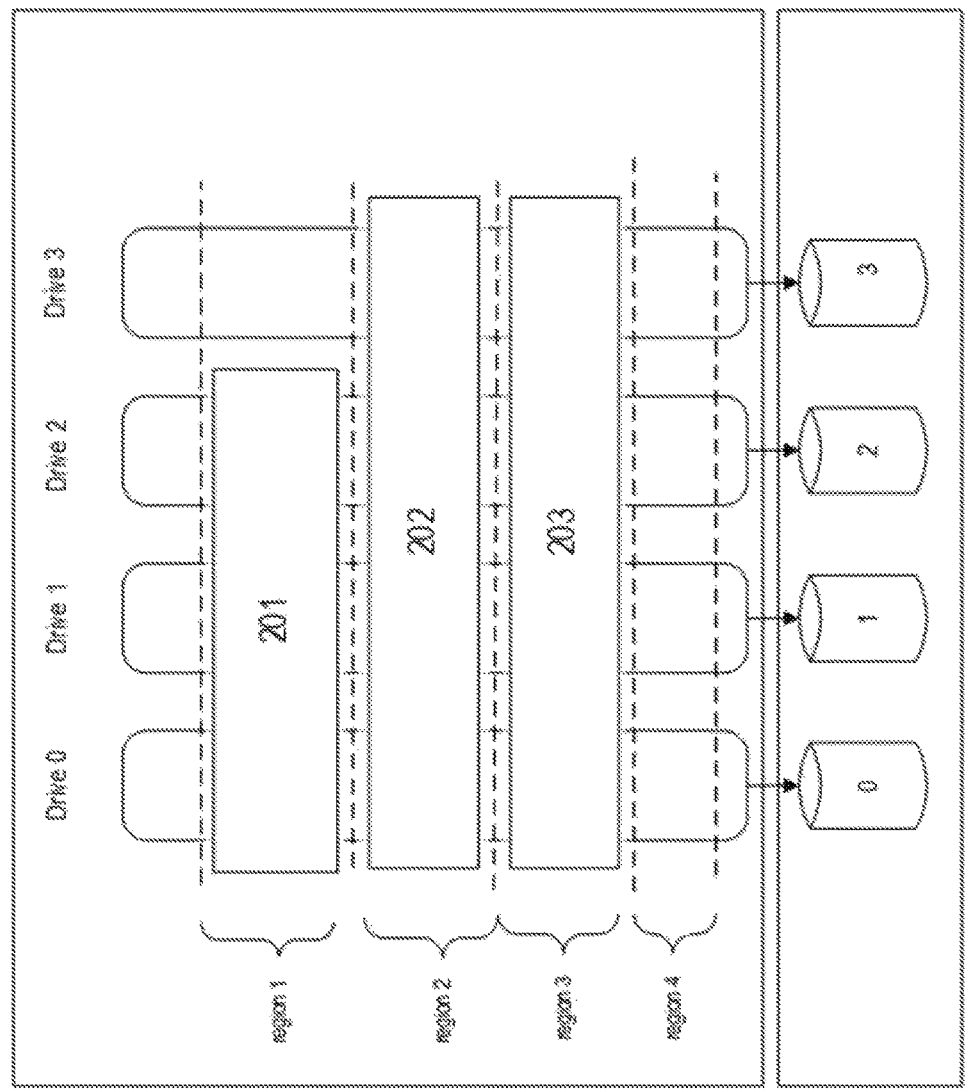
FIG. 2 illustrates a schematic layout of storage areas on a system disk.

In order to facilitate illustration, it will be taken as an example that the system disk includes 4 disk drives hereinafter. FIG. 2 illustrates a schematic layout of storage areas on a system disk. As illustrated in FIG. 2, system disk drives 0-3 are partitioned into a plurality of areas (for example, areas 1, 2, 3, 4 ... ), respectively, where each area is managed by a RAID with a specific level. For example, area 1 is managed by a triple mirror RAID 201, area 2 is managed by a RAID 202 of a RAID 5 level, while area 3 is managed by a RAID 203 of a RAID 3 level and the like. Generally speaking, each system disk drive will be associated with at least one RAID. Those skilled in the art should also understand that although FIG. 2 specifically illustrates RAIDs 201-203 in three areas, in implementation, it may also include other various RAIDs according to the specific needs. The present invention is not limited in this aspect.

In the layout illustrated in FIG. 2, if only a system disk 0 fails or is lost, because each RAID will provide redundant data, the areas 1-3 can still provide I/O services despite of deteriorated performance. When system disks 0 and 1 fail or are lost, for the triple mirror RAID 201, they can still provide I/O services despite of deteriorated performance, because the lost data can be still recovered from the remaining disk. However, for the RAID 5 202 or the RAID 3 203, the area of the RAID 5 202 or RAID 3 203 level (for example, areas 2 and 3 in FIG. 2) will be in a "broken" state and cannot provide I/O services, because the provided redundancy degree cannot support recovery of the disk data. At this point, it needs to replace the failed or lost system disk with a new disk. In this way, the triple mirror RAID 201 can automatically reconstruct the lost data from the unbroken system data; while the RAID 5 203 or RAID 3 203 needs to recover the lost data from the backup data.

Regardless of what the circumstances are, they all require that the new disk can be accepted by the storage system and can be used as a part of the storage system. For the convenience of illustration, the present disclosure will refer to the procedure of replacing the failed system disk with a new disk used as a part of the storage system as "new disk initialization." The initialization procedure of each new disk mainly includes the following steps:

1. Updating configuration information of the new disk into a storage system;

2. In all created (i.e., running) disk arrays, notifying the disk arrays of which performance has been deteriorated but can be still recovered therefrom (for example, in FIG. 2, RAID 5 202 or RAID 3 203 can be recovered when one system disk is broken; the triple mirror RAID 201 can be recovered when at least one system disk is broken) that data in the disk are to be recovered;

3. When all created disk arrays associated with the new disk (or the replaced original system disk) are notified that data in the recovery disk, adding the new disk into the storage system to be available for the storage system to use.

It may be seen that in the created disk array, if disk arrays of which performance has been extremely deteriorated, for example, the disk arrays are in a "broken" state (for example, in FIG. 2, RAID 5 202 or RAID 3 203 is in a "broken" state when two system disks are broken), then in step 2, the disk array will not be notified that the data in the disk is to be recovered, such that step 3 will not be performed because in the disk arrays associated with the disk (for example, for the system disk 0, the triple mirror RAID 201, RAID 5 202, and RAID 3 203 are associated therewith), there are disk arrays which are not notified that data in the recovery disk are to be recovered (for example, in FIG. 2, two broken system disks, i.e., RAID 5 202 and RAID 3 203, are notified due to in a "broken" state), such that initiation of the new disk cannot be completed, and the new disk cannot be used as a part of the storage system.

Figure 3:
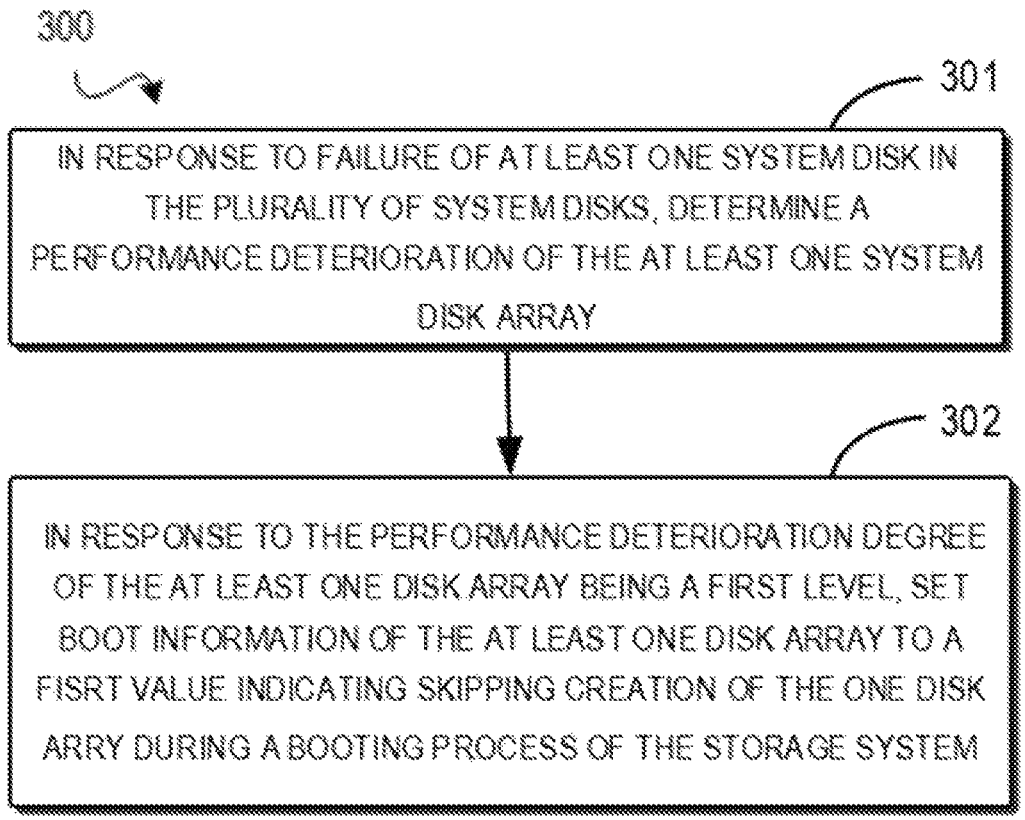
FIG. 3 illustrates a method 300 for recovering a storage system according to an exemplary embodiment of the present invention.

In order to solve this problem, FIG. 3 illustrates a method 300 that facilitates recovering a storage system according to an exemplary embodiment of the present invention. The storage system includes a plurality of system disks for storing system information of the storage system, and at least one disk array associated with the plurality of system disks for managing the plurality of system disks. The method 300 comprises 301: in response to failure of one or more system disks in the plurality of system disks, determining a performance deterioration degree of the one or more disk arrays.

As described above, when a system disk fails, performance of at least one disk array associated with the system disk for managing the system disk will deteriorate. Dependent on the severity of the failure (for example, the number of broken system disks), the performance deterioration degrees of the disk array are also different. For example, in a general deterioration circumstance, the disk array can be recovered therefrom; while in an extreme deterioration circumstance, the disk array might be in a "broken" state, such that the disk array cannot be recovered. Therefore, the performance deterioration as referred to in 301 not only includes a general deterioration in which the disk array can be recovered therefrom but also includes a "broken" situation in an extreme deterioration circumstance.

Next, the method 300 proceeds to 302, where in response to the performance deterioration degree of the one or more disk arrays being a first level, boot information of the one disk array is set to a first value, the first value indicating skipping creation of the one disk array during a booting process of the storage system.

It should be understood that each disk array has their respective boot information. Each time the storage system is booted, respective disk arrays will be created one by one. During the creation procedure, its corresponding boot information needs to be referenced so as to, for example, understand whether this boot is a normal boot to create a RAID or re-create a RAID after the new disk is launching. Where a corresponding RAID will be created in normal boot to create a RAID or re-recreate a RAID after the new disk is on line, the difference lies only in that in the latter circumstance, after the RAID is created, the data therein will be completely set to zero. The boot information may also be stored in the system disk for example in the manner of a triple mirror RAID, so as to be available for creating a disk array.

In an exemplary embodiment according to the present invention, except for the indications of two ways of creating the disk arrays regarding the above normal boot to create and re-create the disk arrays, another "no creation" indication, for example, may also be provided. When the boot information is a "no creation" indication, it indicates that during the boot process of the storage system, creation of a disk array corresponding to the initiation information is skipped (or not performed), and a procedure of creating a next disk array is performed. At 302 of the method 300 according to the present invention, it is controlled not to create the disk array in a predetermined performance deterioration level (for example, a first level).

Taken the layout of FIG. 2 as an example, when both of the system disk 0 and the system disk 1 are broken, according to the method 300 of FIG. 3, it enables the boot information of the RAID 5 202 and the RAID 3 203 in a "broken" state, for example, being set to "no creation," such that upon booting of the storage system, the RAID 5 202 and the RAID 3 203 are both skipped from creating, while only the triple mirror RAID 202 is created. In other words, the created or running disk array only includes the triple mirror RAID 201. In this case, for each failed system disk, during the process of replacing the system disk with a new disk so as to perform initialization of the new disk, the created disk array does not include the RAID 5 202 or the RAID 3 203; while the triple mirror RAID 201, due to in a deteriorated state, will be notified to recover the data in the disk, then step 2 of the initializing procedure can be performed smoothly. Next, because the created disk array associated with disk 0 and disk 1 only has a triple mirror RAID 201, while the RAID is further notified to recover the data in the disk, step 3 can be performed smoothly, such that initialization of the new disk can be performed.

Once the new disk can be successfully initialized, the storage system can automatically or manually recover data in the original system disk. For example, in FIG. 2, for the triple mirror RAID 201, when the two system disks 0 and 1 are replaced, data may be recovered from the system disk 2 that has not been replaced yet; while for the RAID 5 202 and RAID 3 203, the data in the system disk may be recovered from the backup data. In this way, it may be prevented to return the system disk to the manufacturer, which causes rewriting of all data, such that efficiency is enhanced while cost is saved.

It should be understood that although the layout of FIG. 2 is taken as an example in the depiction of FIG. 3 to describe the RAID 5 and RAID 3 in detail, the present invention is not limited thereto. For example, according to the redundancy degrees provided by different disk arrays, the performance deterioration degree represented by the "first level" in 302 or the number of broken system disks may differ somewhat.

Besides, according to a further embodiment of the present invention, the method 300 may also include the following steps: in response to one system disk in failed system disks being replaced, determining a performance deterioration degree of the at least one disk array; and in response to the performance deterioration degree of the at least one disk array being a second level, notifying the one disk array that data of the one system disk is to be recovered.

As described above, after the system disk of the storage system fails, the original failed disk is to be replaced with a new disk. When the new disk is inserted into a corresponding slot, the aforementioned procedure of initializing the new disk will be triggered. During this procedure, a performance deterioration degree of at least one disk array is first determined. Those skilled in the art should understand that the "at least one disk array" of which performance deterioration degree will be determined refers to the disk arrays that have been created or are currently running. For a disk array of which performance deterioration degree is a second level, the disk array is notified that data in the replaced system is to be recovered. It should be noted that the specific meaning of "second level" referred to here may differ dependent on actual implementation. For example, it may refer to a disk array which has a deteriorated performance but can still be recovered therefrom (for example, in FIG. 2, RAID 5 202 or RAID 3 203 may be recovered when one system disk is broken; the triple mirror RAID 201 may be recovered when one or two system disks are broken). In a specific implementation according to the present application, it can be determined whether the deterioration degree is in a first level or a second level based on the number of failed system disks. For example, for the layout of FIG. 2, when one system disk is broken, the RAID 5 202, RAID 3 203, and triple mirror RAID 201 are all in a general deterioration level, while two system disk are broken, the triple mirror RAID 201 is in a general deterioration level, but the RAID 5 202 and RAID 3 203 are in a broken level. Alternatively, a performance deterioration degree at the first level is higher than a performance deterioration degree at the second level.

In addition, in an optional embodiment of the present invention, failure of one or more system disks at 301 of the method 300 includes a circumstance of failure of two system blocks so as to handle the scenario of RAID 5 or RAID 3.

According to a further embodiment of the present invention, the method 300 may also include the following step: when all disk arrays associated with the one system disk are notified that the data of the one system is to be recovered, using the replaced system disk as a part of the storage system.

It should be noted that the "all disk arrays associated with the system disk" in the step refer to all disk arrays associated with the system disk among the created or running disk arrays, excluding those disk arrays that were originally associated with the system disk but are not actually created due to some reasons (for example, their boot information are set to "no creation"). Taken the layout shown in FIG. 2 as an example, when the system disks 0 and 1 are broken and the system disk 0 is replaced, although the disk arrays originally associated with system disk 0 include the triple mirror RAID 201, RAID 5 202, and RAID 3 203, if the RAID 5 202 and the RAID 3 202 are not created because the boot information is set to "no creation," the disk arrays associated with the system disk 0 only include the triple mirror RAID 201. When the triple mirror RAID 201 is notified to recover the data in the disk, the new disk is added in the storage system for the storage system to use. Further, in a further embodiment of the present invention, data of the replaced system disk may be recovered from the backup data of the storage system.

In addition, according to a further embodiment of the present application, after the replaced system disk is used as a part of the storage system, the method 300 may also include: modifying the boot information of which value is the first value as a second value which indicates to create, during a booting process of the storage system, a disk array corresponding thereto, and all data in the created disk array will be set to zero.

Because in the method 300, in order to successfully initialize the new disk, creation of some disk arrays (e.g., the performance deterioration degree is a first level) may be skipped. In this case, after the new disk is successfully initialized, the previously skipped disk arrays need to be re-created. Therefore, value of the boot information which was previously set to the first value is modified to a second value that is different from the first value. For example, in the implementation, the second value may be "re-creation" or "creation" and the like. The second value will indicate to create a disk array corresponding to the boot information during the next boot procedure of the storage system. Alternatively, for the circumstance where the new disk is just initialized, the second value may be set to a value such as "re-creation," so as to indicate that all data in the disk array will be set to zero during the boot process.

In some embodiments, the method 800 terminates after 302.

Figure 4:
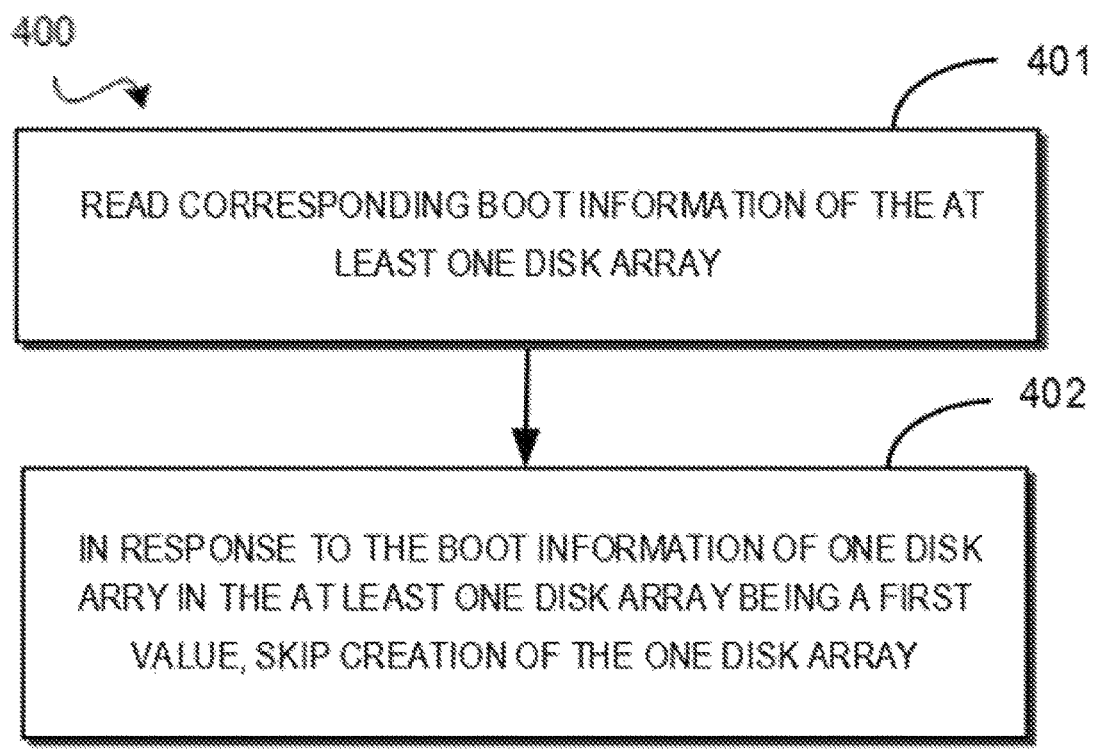
FIG. 4 illustrates a method 400 for booting a storage system according to an exemplary embodiment of the present invention.

Hereinafter, a method 400 for booting a storage system according to an exemplary embodiment of the present invention will be described with reference to FIG. 4. The storage system comprises a plurality of system disks for storing system information of the storage system, and at least one disk array associated with the plurality of system disks for managing the plurality of system disks. The method 400 includes 401, where reading corresponding boot information of the at least one disk array; and 402 where in response to the boot information of one disk array in the at least one disk array being a first value, skipping creation of the one disk array.

Those skilled in the art should understand that meanings of respective terms in method 400 and relevant implementations are similar to the method 300 depicted above with reference to FIG. 3. For example, the boot information depicted in 302 of the method 300 will be used in 401 and 402 of the method 400. Therefore, the exemplary implementation details of the method 400 are similarly executed with reference to the method 300, which will not be detailed here. Likewise, through the method for booting a storage system as described in method 400, the storage system may selectively skips creating of some disk arrays of which performance has been deteriorated to a certain degree during the booting procedure of the storage system, thereby guaranteeing that the procedure of replacing a failed system disk with a new disk can be performed smoothly, finally cost-effectively recovering the failed storage system.

Figure 5:
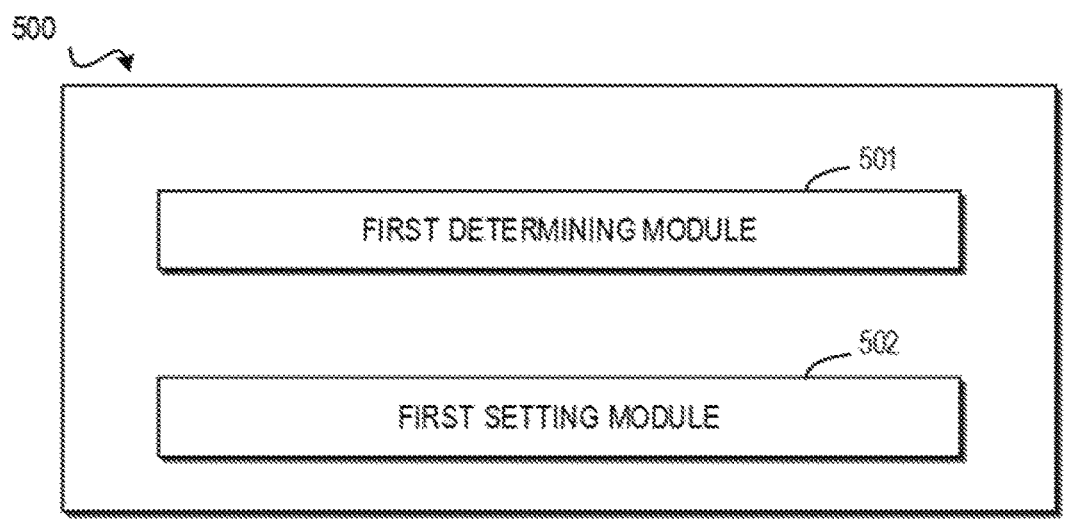
FIG. 5 illustrates a schematic block diagram of an apparatus 500 for recovering a storage system according to an exemplary embodiment of the present invention.

An apparatus 500 for recovering a storage system according to an exemplary embodiment of the present invention will be described hereinafter with reference to FIG. 5. The storage system includes a plurality of system disks for storing system information of the storage system and at least one disk array associated with the plurality of system disks to manage the plurality of system disks. As illustrated in FIG. 5, the apparatus 500 comprises: a first determining module 501 configured to, in response to failure of at least one system disk in the plurality of system disks, determine a performance deterioration degree of the at least one disk array; and a first setting module 502 configured to, in response to the performance deterioration degree of the at least one disk array being a first level, set boot information of the one disk array to a first value indicating skipping creation of the one disk array during a booting process of the storage system.

In an optional embodiment of the present invention, the apparatus 500 further includes: a second determining module configured to, in response to one system disk in failed system disks being replaced, determine a performance deterioration degree of the one or more disk arrays; and a notifying module configured to, in response to the performance deterioration degree of the at least one disk array being a second level, notify the one disk array that data of the one system disk is to be recovered. In a further optional embodiment of the present invention, a performance deterioration degree at the first level is higher than a performance deterioration degree at the second level.

In an optional embodiment of the present invention, the apparatus 500 further comprises: a new disk launching module configured to, when all disk arrays associated with the one system disk are notified that the data of the one system is to be recovered, use the replaced system disk as a part of the storage system. In a further optional embodiment of the present invention, the new disk launching module is further configured to, after using the replaced system disk as a part of the storage system, modify the boot information of which value is the first value as the second value.

In an optional embodiment of the present invention, the apparatus 500 further includes: a recovering module configured to recover data of the replaced system disk from the backup data of the storage system.

In an optional embodiment of the present invention, the first level or the second level is determined based on the number of failed system disks.

In an optional embodiment of the present invention, the disk array includes at least one of RAID 3 and RAID 5.

In an optional embodiment of the present invention, failure of the at least one system disk includes failure of two system disks.

Figure 6:
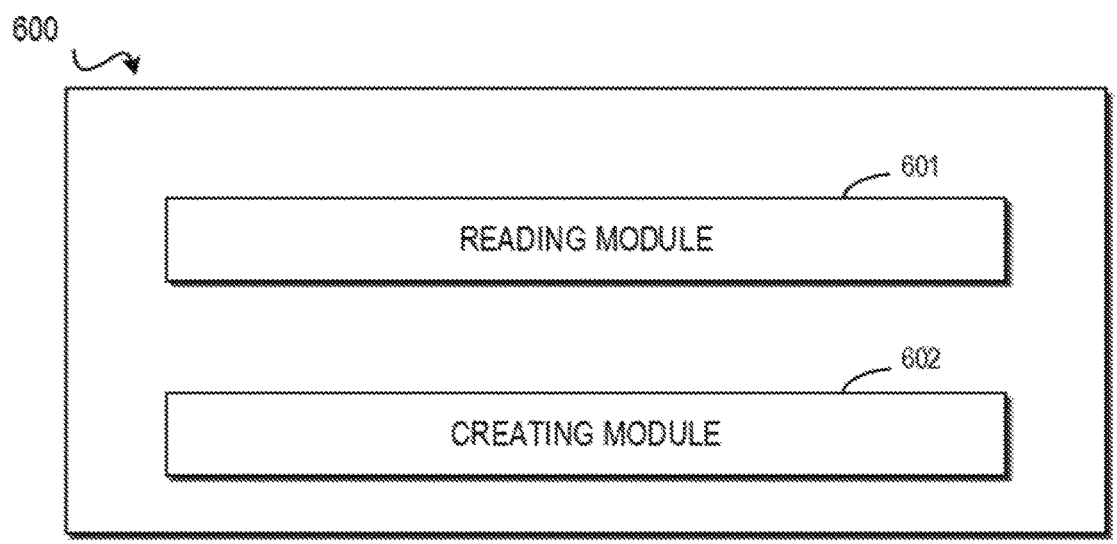
FIG. 6 illustrates a schematic block diagram of an apparatus 600 for booting a storage system according to an exemplary embodiment of the present invention.

Hereinafter, an apparatus 600 for booting a storage system according to an exemplary embodiment of the present invention will be described with reference to FIG. 6. The storage system includes a plurality of system disks for storing system information, and at least one disk array associated with the plurality of system disks for managing the plurality of system disks. The apparatus 600 includes: a reading module 601 configured to read corresponding boot information of the at least one disk array; and a creating module 602 configured to, in response to the boot information of one disk array in the at least disk array being a first value, skip creation of the one disk array.

In an optional embodiment of the present invention, the creating module is further configured to create the one disk array, in response to the boot information of one disk array in the at least one disk array being a second value different from the first value.

Hereinafter, refer to FIG. 7, in which a schematic block diagram of a computer system 700 adapted for implementing the exemplary embodiments of the present invention is illustrated. For example, the computer system 700 as illustrated in FIG. 7 may be used for implementing respective components of the apparatus 500 for recovering a storage system and an apparatus 600 for booting a storage system as described above, and may also be used for solidifying or implementing respective steps of the method 300 for recovering a storage system and the method 400 for booting a storage system as described above.

Figure 7:
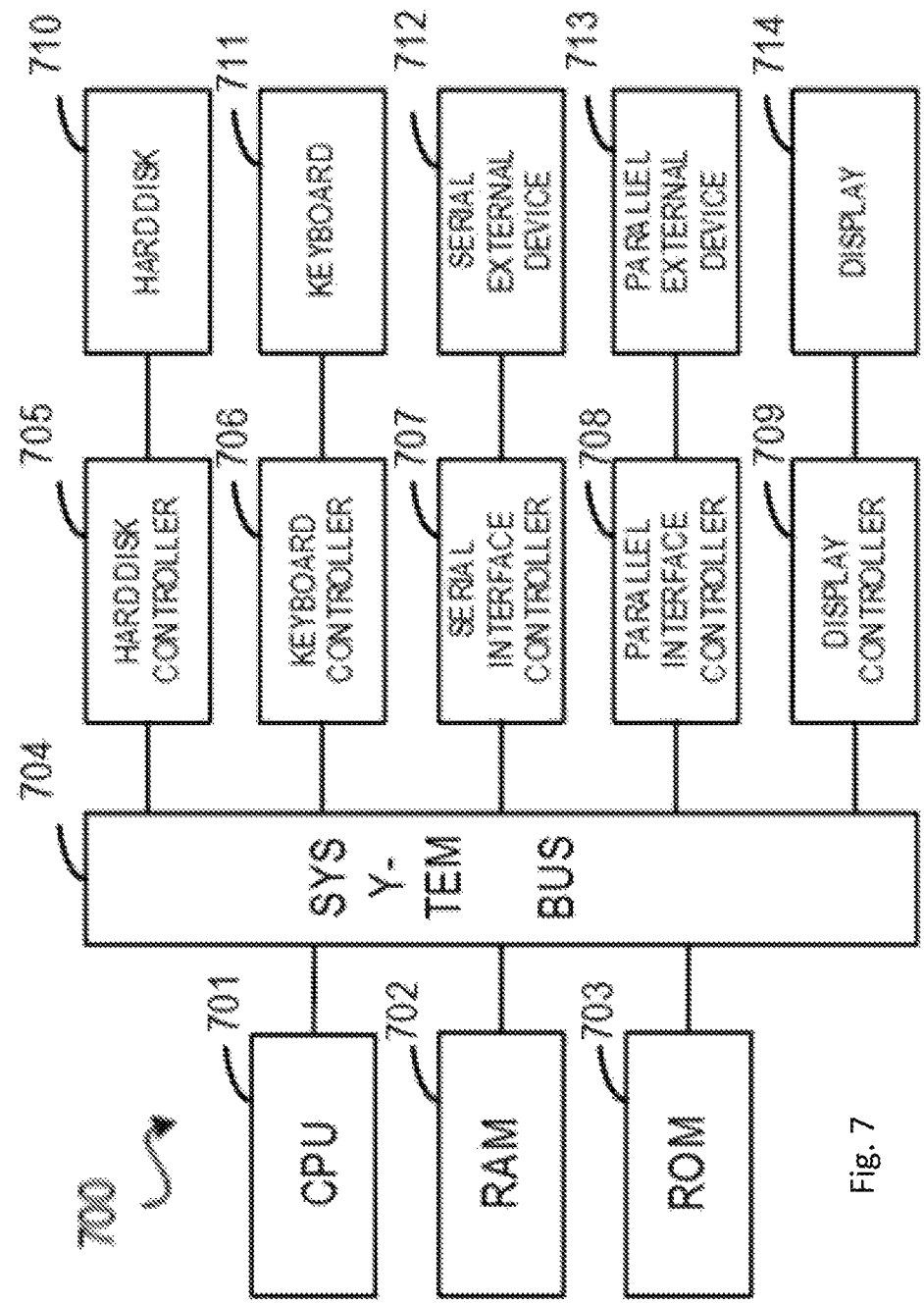
FIG. 7 illustrates a schematic block diagram of a computer system 700 adapted for implementing the exemplary embodiments of the present invention.

As illustrated in FIG. 7, the computer system may include: a CPU (central processing unit) 701, a RAM (random access memory) 702, a ROM (read only memory) 703, a system bus 704, a hard disk controller 705, a keyboard controller 706, a serial interface controller 707, a parallel interface controller 708, a display controller 709, a hard disk 710, a keyboard 711, a serial external device 712, a parallel external device 713 and a display 714. In these devices, what are coupled to the system bus 704 include the CPU 701, the RAM 702, the ROM 703, the hard disk controller 705, the keyboard controller 706, the serial interface controller 707, the parallel interface controller 708, and the display controller 709. The hard disk 710 is coupled to the hard disk controller 705, the keyboard 711 is coupled to the keyboard controller 706, the serial external device 712 is coupled to the serial interface controller 707, the parallel external device 713 is coupled to the parallel interface controller 708, and the display 714 is coupled to the display controller 709. It should be understood that the structural block diagram as shown in FIG. 4 is only illustrated for exemplary purposes, not for limiting the scope of the present invention. In some cases, some devices may be added or reduced dependent on specific situations.

As described above, the system 300 may be implemented as pure hardware, e.g., chip, ASIC, SOC and the like. Such hardware may be integrated into the computer system 700. Besides, the embodiments of the present invention may also be implemented in a form of a computer program product. For example, the method 300 or 400 described with reference to FIG. 3 or 4 may be implemented by a computer program product. The computer program product may be stored in the RAM 702, the ROM 703, the hard disk 710 and/or any appropriate storage medium as shown in FIG. 7, or downloaded onto the computer system 700 from an appropriate location via the network. The computer program product may include a computer code section including program instructions that may be performed by an appropriate processing device (e.g., the CPU 701 shown in FIG. 7). The computer program instruction at least may include instructions for implementing the method 300. These instructions, for example, include: an instruction for, in response to failure of one or more system disks in the plurality of system disks, determining a performance deterioration degree of the at least one disk array; and an instruction for, in response to the performance deterioration degree of the at least one disk array being a first level, setting boot information of the one disk array to a first value indicating skipping creation of the one disk array during a booting process of the storage system.

The spirits and principles of the present invention have been illustrated in conjunction with a plurality of specific embodiments. The method and apparatus for recovering a storage system, and a method apparatus for booting a storage system according to the present invention have many advantages over the prior art. For example, the present invention may selectively skip creating of some disk arrays of which performance has been deteriorated to a certain degree during the booting procedure of the storage system, thereby guaranteeing that the procedure of replacing a failed system disk with a new disk can be performed smoothly, finally cost-effectively recovering the failed storage system.

It should be noted that the embodiments may be implemented by hardware, software or a combination of software and hardware. The hardware section may be implemented using a specific logic; the software part may be stored in a memory and executed by an appropriate instruction executing system, for example, a microprocessor or specifically designed hardware. A person of ordinary skills in the art may understand that the above devices and methods may be implemented using a computer executable instruction and/or included in processor controlled code, for example, a carrier medium such as a magnetic disk, a CD or a DVD-ROM, a programmable memory such as a read-only memory (firmware) or a data carrier such as an optical or electronic signal carrier. The apparatus and its modules of the present invention may be implemented by a semiconductor such as a very large scale integrated circuit or gate array, a semiconductor such as a logic chip, a transistor and the like, or a hardware circuit of a programmable hardware device such as a field programmable gate array, a programmable logic device and the like, or implemented by software executed by various types of processors, or implemented by a combination of the above hardware circuits and software, for example, firmware.

It should be noted that although several modules or sub-modules of the apparatus have been described in detail above, such partition is not restrictive. Actually, according to the embodiments of the present invention, the features and functions of two or more modules as described above may be embodied in one module. In contrast, features and functions of one module as described above may be further partitioned into a plurality of modules to be embodied.

Additionally, although the operations of the method according to the present invention have been described in a specific order in the drawings, this does not require or imply that these operations must be executed in the specific order, or a desired outcome can only be achieved by executing all of the shown operations. Instead, the steps described in the flow charts may be executed in a different order. Additionally or alternatively, some steps may be omitted; a plurality of steps may be merged into one step to execute, and/or a step may be decomposed into a plurality of steps for execution.

Although the present invention has been described with reference to several preferred embodiments, it should be understood that the present invention is not limited to the preferred embodiments as disclosed. The present invention intends to cover various modifications and equivalent arrangements included within the spirits and scope of the appended claims. The scope of the appended claims satisfies a broadest explanation, thereby including all of such modifications and equivalent structures and functions.

We claim:

1. A method of facilitating recovery of a storage system, the storage system including a plurality of system disks for storing system information of the storage system and at least one disk array with the plurality of system disks for managing the plurality of system disks, the method comprising:
in response to determining that at least one system disk in the plurality of system disks fails, determining a performance deterioration degree of the at least one disk-array; and
in response to the performance deterioration degree of the disk array being at a first level, setting boot information of the disk array to a first value, the first value indicating skipping creation of the disk array during a booting process of the storage system.

2. The method of claim 1, further comprising:
in response to a failed system disk in the at least one failed system disk being replaced, determining a performance deterioration degree of the at least one disk array; and
in response to the performance deterioration degree of a disk array in the at least one disk array being at a second level, notifying the disk array of recovery of data in the failed system disk.

3. The method of claim 2, wherein a performance deterioration degree at the first level is higher than a performance deterioration degree at the second level.

4. The method of claim 2, further comprising:
in response to all disk arrays associated with the failed system disk being notified of the recovery of the data in the failed system disk, using a replaced system disk as a part of the storage system.

5. The method of claim 4, further comprising:
recovering data of the replaced system disk from backup data in the storage system.

6. The method of claim 5, wherein after using the replaced system disk as a part of the storage system, the method further comprises:
modifying the boot information of which value is the first value as a second value, the second value indicating creating one of a corresponding disk array with all data in the created disk array set to zero during a booting process of the storage system.

7. The method of claim 1, wherein the first level or the second level is determined based on the number of the at least one failed system disk.

8. The method of claim 1, wherein the disk array includes at least one of RAID 3 and RAID 5.

9. The method of claim 1, wherein two of the plurality of system disks are failed.

10. A method of booting a storage system, the storage system including a plurality of system disks for storing system information of the storage system and at least one disk array associated with the plurality of system disks for managing the plurality of system disks, the method comprising:
reading corresponding boot information of the at least one disk array; and in response to the boot information of the disk array in the at least one disk array being a first value, skipping creation of the disk array.

11. The method of claim 10, further comprising:
in response to the boot information of a disk array in the at least one disk array being a second value, creating the disk array, the second value being different from the first value.

12. An apparatus for facilitating recovery of a storage system, the storage system including a plurality of system disks for storing system information of the storage system, and at least one disk array associated with the plurality of system disks for managing the plurality of system disks, the apparatus comprising, a processor further comprising:
a first determining module configured to, in response to determining that at least one system disk in the plurality of system disks fails, determine a performance deterioration degree of the at least one disk array; and
a first setting module configured to, in response to the performance deterioration degree of the at least one disk array being a first level, set boot information of the disk array to a first value, the first value indicating skipping creation of the disk array during a booting process of the storage system.

13. The apparatus of claim 12, wherein the processor further comprises:
a second determining module configured to, in response to a failed system disk in the at least one failed system disk being replaced, determine a performance deterioration degree of the at least one disk array; and
a notifying module configured to, in response to the performance deterioration degree of a disk array in the at least one disk array being at a second level, notify the disk array of recovery of data in the failed system disk.

14. The apparatus of claim 13, wherein a performance deterioration degree at the first level is higher than a performance deterioration degree at the second level.

15. The apparatus of claim 13, wherein the processor further comprises:
a new disk launching module configured to, in response to all disk arrays associated with the failed system disk being notified of the recovery of the data in the failed system disk, use a replaced system disk as a part of the storage system.

16. The apparatus of claim 15, wherein the processor further comprises:
a recovering module configured to recover data of the replaced system disk from backup data in the storage system.

17. The apparatus of claim 15, wherein the new disk launching module is further configured to modify the boot information of which value is the first value as a second value after using the replaced system disk as a part of the storage system.

18. The apparatus of claim 12, wherein the first level or the second level is determined based on the number of the at least one failed system disk.

19. The apparatus of claim 12, wherein the disk array includes at least one of RAID 3 and RAID 5.

20. The apparatus of claim 12, wherein two of the plurality of system disks are failed.

* * * * *